US008672513B2

(12) United States Patent
Redpath et al.

(10) Patent No.: US 8,672,513 B2
(45) Date of Patent: Mar. 18, 2014

(54) METHOD OF USING LIGHT STRIPING FOR FIRE RESCUE NAVIGATION

(76) Inventors: Richard Redpath, Cary, NC (US); James Redpath, Cary, NC (US)

(*) Notice: Subject to any disclaimer, the term of this patent is extended or adjusted under 35 U.S.C. 154(b) by 0 days.

(21) Appl. No.: 13/601,559

(22) Filed: Aug. 31, 2012

(65) Prior Publication Data

US 2012/0326635 A1 Dec. 27, 2012

Related U.S. Application Data

(63) Continuation-in-part of application No. 13/013,427, filed on Jan. 25, 2011, now abandoned.

(51) Int. Cl.
*G02B 27/20* (2006.01)

(52) U.S. Cl.
USPC ............................ 362/259; 362/103; 362/253

(58) Field of Classification Search
USPC ................... 362/259, 103, 108, 234, 253; 2/5
See application file for complete search history.

(56) References Cited

U.S. PATENT DOCUMENTS

| 6,031,649 | A | * | 2/2000 | Cotty et al. | 359/196.1 |
|---|---|---|---|---|---|
| 6,724,467 | B1 | * | 4/2004 | Billmers et al. | 356/5.04 |
| 6,864,799 | B2 | * | 3/2005 | Popps et al. | 340/693.5 |
| 7,614,765 | B2 | * | 11/2009 | Reason | 362/259 |
| 8,360,612 | B2 | * | 1/2013 | Redpath et al. | 362/259 |
| 2004/0012962 | A1 | * | 1/2004 | Wolf | 362/259 |
| 2009/0086489 | A1 | * | 4/2009 | Scott et al. | 362/259 |

* cited by examiner

*Primary Examiner* — Peggy A. Neils
(74) *Attorney, Agent, or Firm* — Ming Chow; Sinorica, LLC

(57) ABSTRACT

The present invention provides a method of using a laser lighting apparatus for fire rescue navigation in a smoke-filled structure. The laser lighting apparatus is portably carried at a user's body and directly operated by the user to perform the steps of turning the laser lighting apparatus on to output one or more coherent light planes; projecting the one or more coherent light planes on objects in the smoke-filled structure to produce one or more light stripes on surfaces of the objects; and identifying the objects in the smoke-filled structure from the one or more light stripes.

5 Claims, 3 Drawing Sheets

METHOD OF USING LIGHT STRIPING FOR FIRE RESCUE NAVIGATION

The present application is a continuation-in-part application of, and claims a priority to the U.S. Non-provisional application Ser. No. 13/013,427 filed on Jan. 25, 2011 now abandoned.

BACKGROUND

1. Field of the Invention

The present invention relates to a method for fire rescue navigation, and more particularly relates to a method of using light striping to provide illumination and navigation in smoke-filled structures.

2. Description of the Prior Art

Visibility inside a burning building is very limited because of heavy smoke or flame. When a building is on fire, firefighters have to enter various parts of the building for emergency rescue, but because of poor visibility in the smoke-filled building, the firefighters may become disorientated and may be unable to find exits or notice holes or damages in the floor, which is very dangerous and also makes it hard to implement effective rescue. So smoke area lighting is a critical problem for fire rescue. The typical practice is to place a flashlight at the exit, with the beam of the flashlight pointing in the direction from which the firefighter expects to exit later. However, the flashlight beam usually does not penetrate very far. This is because the flashlight emits white or incoherent light. The full spectrum light illuminates the smoke molecules which reflect the light, thereby reducing penetration of the flashlight beam through the smoke and also causing blinding light to occur.

Coherent light such as a laser beam can penetrate smoke areas without the blinding reflection of commonly used flashlight sources and thus be considered as a distinguished lighting source for use in smoke-filled structures. But a single laser beam still cannot achieve a satisfactory lighting effect for fire rescue since a single laser beam is simply a point when projected on an object. Meanwhile, using multiple lasers would be an issue as each laser requires power supply and heat dissipation, and thus would increase the power consumption and the limitation of the operating environment. Therefore, a new technique is desirable to use a single laser source to produce multiple beams of coherent light, one or more light planes for illumination and navigation in smoke-filled structures.

In addition, prior arts of using a light striping method to reconstruct a 3D dimensional form of an object have existed since the 1980's in the field of 3D measurements. A light striping vision system uses one or more light stripes projected onto a 3D object by a line laser source to detect the image coordinates of the light stripes and obtain 3D coordinates of the surface points of an object. The line laser source generates one or more coherent light planes that can create a 3D visual effect when illuminating an indoor space. So it can be conceived to utilize a similar light striping vision system to provide illumination and navigation for fire rescue.

The conventional light striping vision system has never been envisioned for fire rescue navigation and never been designed as a portable device that can be easily carried and directly controlled by a human being. In this respect, the laser lighting apparatus and method for fire rescue navigation of the current invention substantially departs from the conventional design of light striping vision systems for 3D object measurements, and is aimed at providing an improved lighting apparatus and method for illumination and navigation in smoke-filled structures.

SUMMARY OF THE INVENTION

According to an aspect of the current invention, a laser lighting apparatus for fire rescue navigation is disclosed in view of the above problems associated with existing smoke area lighting devices. The laser lighting apparatus utilizes a laser source together with a diffraction grating to create one or more light planes projecting on objects in a smoke-filled structure and thus allow a human being, e.g. a firefighter therein to identify obstacles or exits and implement effective emergency rescue. The apparatus only needs a single laser source but allows for one or more light planes to illuminate and navigate the smoke-filled structure, thereby addressing the emergency use of power and limiting the detrimental result of heat dissipation.

Due to the use of a diffraction grating in the laser lighting apparatus, the laser beam emitted by the single laser source may be diffracted by the diffraction grating into a laser light plane that can penetrate a smoke-filled structure, project onto objects within the smoke-filled structure and create a 3D visual effect therein. Therefore, the contours of the projected objects can be easily identified by the firefighter.

According another aspect of the current invention, a method of using the laser lighting apparatus for fire rescue is disclosed. When a user, e.g. a firefighter, carrying the laser lighting apparatus of the invention on his/her body enters a smoke-filled building, the laser lighting apparatus can be controlled by the user to turn on and output one or more light planes. The one or more light planes will project on objects in the building, thereby producing deformed light stripes on surfaces of the objects that can be observed by the firefighter for recognizing the objects in the building.

DETAIL DESCRIPTIONS OF THE INVENTION

The particulars of the invention will become apparent from the following detailed discussion of preferred embodiments of the invention with reference to the accompanying drawings.

Figure 1:
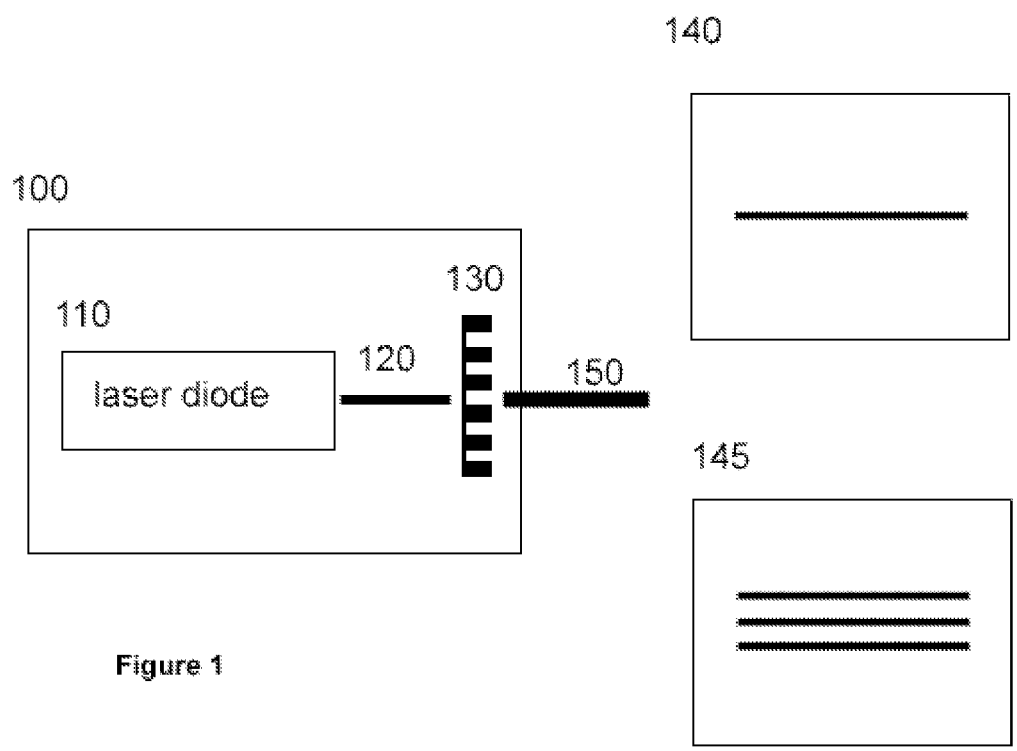
FIG. 1 schematically illustrates a laser lighting apparatus for fire rescue navigation according to an embodiment of the present invention.

FIG. 1 schematically illustrates an exemplary laser lighting apparatus 100 according to an embodiment of the invention. The laser lighting apparatus 100 comprises a laser diode 110 for emitting a laser beam 120 and a diffraction grating 130 for receiving the laser beam 120, diffracting the laser beam 120 and generating an outgoing light beam 150. One skilled in the art of creating enclosures for lighting can be referenced to apply an enclosure for the embodiment, so as to get a product of laser lighting apparatus for use in fire rescue.

Because of the effect of diffraction, a projection of the outgoing light beam 150 of the laser lighting apparatus 100 on a flat target normal thereto is a light stripe as illustrated at 140, from which it can be appreciated that the outgoing laser beam 150 is actually a light plane containing multiple diffracted light beams propagating in different directions on the light plane. Additionally, in order to get more light planes for illumination and navigation, the diffraction grating 130 can be configured as a multiline diffraction grating that is composed of multiple diffraction gratings parallel to each other. For instance, a projection of the outgoing light beam 150 generated from a multiline diffraction grating is illustrated as three light stripes at 145, wherein the multiline diffraction grating comprises three parallel diffraction gratings. Although more light stripes may cover a larger illumination and navigation space, it has been discovered that the number of laser lines should be limited as the walking of a human being, e.g. a firefighter could be disoriented with too much shaking information.

For the purpose of use in fire rescue, the laser diode 110 may be designed to produce green (~532 nm) or blue (445-475 nm) light as the green or blue light will contrast with fire lit areas to distinguish the lighting source. Also, scotopic vision (i.e. the vision of the eye under low light conditions) is stronger for blue to green light.

Figure 2:
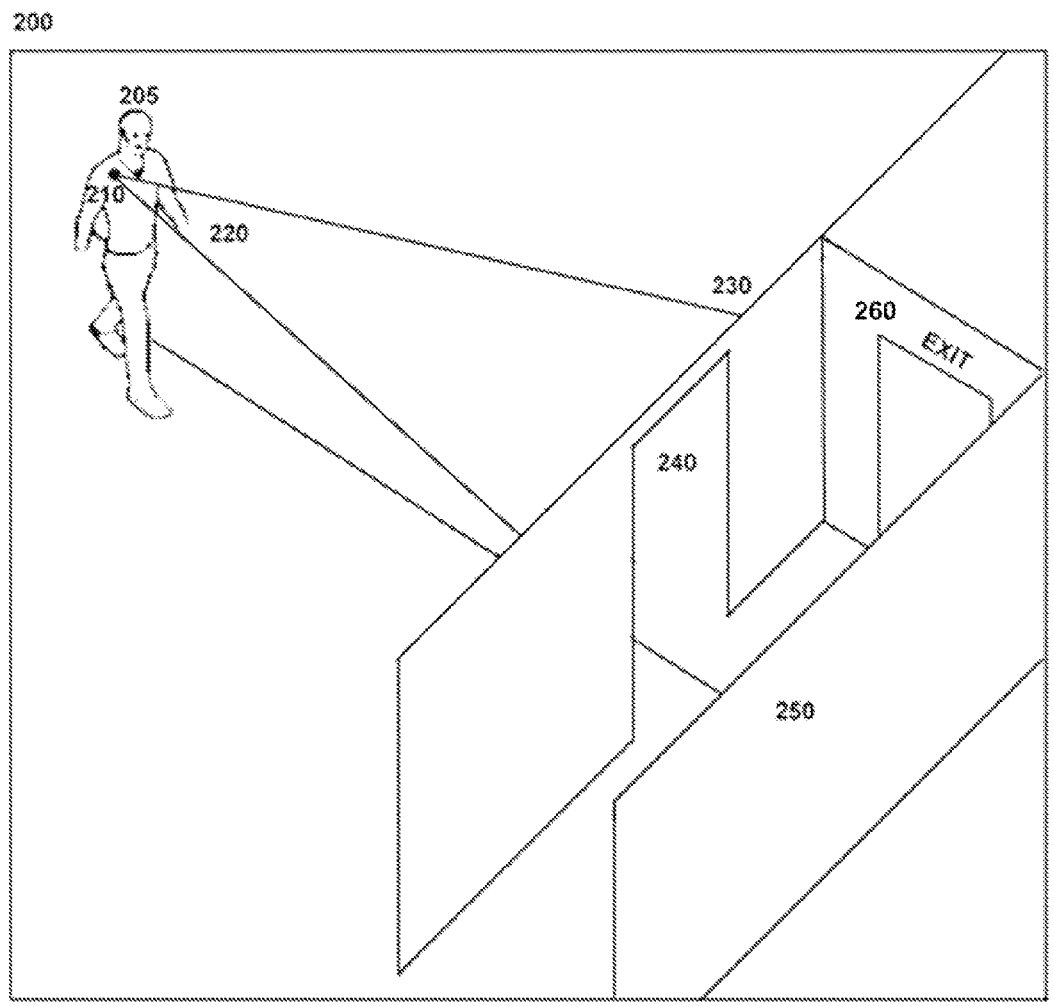
FIG. 2 is a schematic diagram illustrating the use of the laser lighting apparatus of FIG. 1 in a smoke-filled room according to an embodiment of the present invention.
Figure 3:
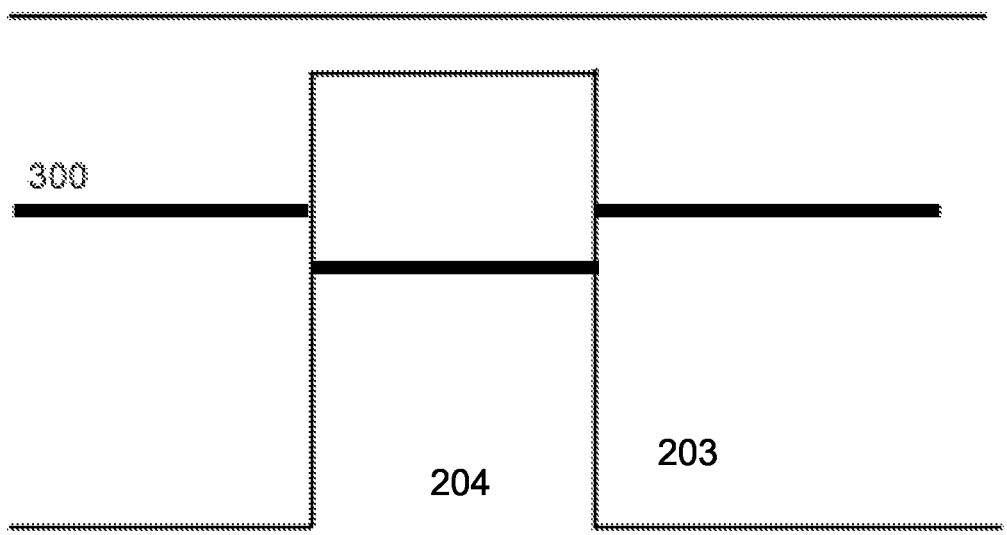
FIG. 3 is a schematic diagram illustrating a projected light stripe in the smoke-filled room of FIG. 2 that can be used for navigation therein.

Referring to FIG. 2, a top view 200 of a smoke-filled room is schematically illustrated. For example, a firefighter 205 is entering the smoke-filled room, and the firefighter 205 has a portable laser lighting apparatus 210 of the present invention mounted at his/her body. When the firefighter 205 is walking to a doorway 240 of the room, the firefighter 205 can turn the laser lighting apparatus 210 on. As discussed above, the laser lighting apparatus 210 will emit a light plane herein marked as 220. The light plane 220 may propagate forward and strike a wall 230 at both sides of the doorway 240 and further strikes a wall 250 behind the doorway 240. As a result, a light stripe is projected on the surface of the wall 230 and the surface of a part of the wall 250 behind the doorway 240. The light stripe will be observed as a broken line indicating that the doorway 240 is present. Then the firefighter 205 can follow the light stripe to identify the doorway 240 and eventually find an exit 260 of the room. The projected light stripe is illustrated in FIG. 3 by a broken stripe 300. The broken stripe 300 provides a 3D visual effect to the firefighter 205 and thus can assist the firefighter 205 to identify objects in the smoke-filled room.

In this embodiment, the laser lighting apparatus 210 is designed as a portable device and mounted at the front body of the firefighter 205, so that while the firefighter 205 is walking through the smoke-filled room, the light plane 220 from the laser lighting apparatus 210 always projects on surfaces of those objects in front of the firefighter 205 and allows the firefighter 205 to recognize the contours of the objects in the room. Meanwhile, the light plane 220 can easily penetrate smoke areas since the light plane 220 is actually composed of numerous coherent light beams Therefore, the laser lighting apparatus according to the embodiment can provide effective navigation in the smoke-filled room.

In addition, as illustrated in FIG. 1, a multiline diffraction grating can be employed to configure the laser lighting apparatus of the invention. In this case, multiple parallel light planes can be generated from the laser lighting apparatus, and consequently multiple parallel light stripes would be projected on a surface of an object in front of the multiple light planes. For example, the broken stripe 300 in FIG. 3 may become multiple broken stripes parallel to each other. Three parallel light stripes may be preferably generated from the laser lighting apparatus, so that the lower light stripe can be very low to project on the floor of a smoke-filled room for identifying holes or damages in the floor, the center light strip can illuminate objects in front of the user for walking navigation and the higher light strip can project on anything hanging down from the ceiling of the room for identifying those objects above the user. Furthermore, instead of being mounted at a user's body, the laser lighting apparatus of the invention can be placed at any appropriate locations in a smoke-filled structure for illumination and navigation.

Although a particular embodiment of the invention has been described in detail for purposes of illustration, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The invention claimed is:

1. A method of using a laser lighting apparatus for fire rescue navigation in a smoke-filled structure, comprising:
    carrying said laser lighting apparatus at a user's body when operating the device, wherein said laser lighting apparatus being directly operated by the user;
    turning the laser lighting apparatus on to output one or more coherent light planes;
    projecting the one or more coherent light planes on objects in the smoke-filled structure to produce one or more light stripes on surfaces of the objects;
    identifying the objects in the smoke-filled structure from the one or more light stripes;
    the laser lighting apparatus includes a diffraction grating and only one laser diode;
    the diffraction grating diffracts a laser beam emitted by the laser diode to generate the one or more coherent light planes;
    the diffraction grating is a multiline diffraction grating that is composed of multiple diffraction gratings parallel to each other; and
    the one or more coherent light planes are green or blue light.

2. A method of using a laser lighting apparatus for fire rescue navigation in a smoke-filled structure, comprising:
    carrying said laser lighting apparatus at a user's body when operating the device, wherein said laser lighting apparatus being directly operated by the user;
    turning the laser lighting apparatus on to output one or more coherent light planes;
    projecting the one or more coherent light planes on objects in the smoke-filled structure to produce one or more light stripes on surfaces of the objects;
    identifying the objects in the smoke-filled structure from the one or more light stripes;
    the laser lighting apparatus includes a diffraction grating and only one laser diode;
    the diffraction grating diffracts a laser beam emitted by the laser diode to generate the one or more coherent light planes; and
    the one or more coherent light planes are green or blue light.

3. The method of using the laser lighting apparatus for fire rescue navigation in the smoke-filled structure of claim 2, wherein
    the diffraction grating is a multiline diffraction grating that is composed of multiple diffraction gratings parallel to each other.

4. A method of using a laser lighting apparatus for fire rescue navigation in a smoke-filled structure, comprising:
    carrying said laser lighting apparatus at a user's body when operating the device, wherein said laser lighting apparatus being directly operated by the user;

turning the laser lighting apparatus on to output one or more coherent light planes;

projecting the one or more coherent light planes on objects in the smoke-filled structure to produce one or more light stripes on surfaces of the objects; and identifying the objects in the smoke-filled structure from the one or more light stripes, wherein the laser lighting apparatus includes a diffraction grating and only one laser diode the diffraction grating diffracts a laser beam emitted by the laser diode to generate the one or more coherent light planes; and the diffraction grating is a multiline diffraction grating that is composed of multiple diffraction gratings parallel to each other.

5. The method of using the laser lighting apparatus for fire rescue navigation in the smoke-filled structure of claim 4, wherein the one or more coherent light planes are green or blue light.

* * * * *